United States Patent
Emons

(10) Patent No.: US 7,076,612 B2
(45) Date of Patent: Jul. 11, 2006

(54) CACHE INTERFACE CIRCUIT FOR AUTOMATIC CONTROL OF CACHE BYPASS MODES AND ASSOCIATED POWER SAVINGS

(75) Inventor: Martijn Johannes Lambertus Emons, Nijmegen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 159 days.

(21) Appl. No.: 09/829,793

(22) Filed: Apr. 10, 2001

(65) Prior Publication Data

US 2001/0032298 A1    Oct. 18, 2001

(30) Foreign Application Priority Data

Apr. 12, 2000    (EP) ................... 00201310

(51) Int. Cl.
*G06F 13/00* (2006.01)

(52) U.S. Cl. .................. 711/138; 711/139; 713/324

(58) Field of Classification Search ............... 711/138, 711/139; 713/324, 320
See application file for complete search history.

(56) References Cited

U.S. PATENT DOCUMENTS

| | | | | |
|---|---|---|---|---|
| 4,075,686 A | * | 2/1978 | Calle et al. ............... | 711/138 |
| 4,429,363 A | * | 1/1984 | Duke et al. .............. | 711/122 |
| 4,506,323 A | * | 3/1985 | Pusic et al. ............. | 711/161 |
| 5,247,639 A | * | 9/1993 | Yamahata ................ | 711/138 |
| 5,546,559 A | * | 8/1996 | Kyushima et al. ........ | 711/133 |
| 5,551,001 A | * | 8/1996 | Cohen et al. ............ | 711/122 |
| 5,632,038 A | | 5/1997 | Fuller .................... | 395/750 |
| 5,682,515 A | * | 10/1997 | Lau et al. ............... | 711/118 |
| 5,729,713 A | * | 3/1998 | Leyrer ................... | 711/118 |
| 5,737,746 A | * | 4/1998 | Hardin et al. ........... | 711/118 |
| 5,809,532 A | * | 9/1998 | Eno et al. .............. | 711/141 |
| 5,875,464 A | * | 2/1999 | Kirk ..................... | 711/129 |
| 5,884,088 A | * | 3/1999 | Kardach et al. ......... | 713/324 |

(Continued)

FOREIGN PATENT DOCUMENTS

JP    2000100054 A  *  4/2000

OTHER PUBLICATIONS

"Power Managed Second-Level Cache Control", IBM Technical Disclosure Bulletin, vol. 39, No. 4, Apr. 1996, XP 000587428.

*Primary Examiner*—Hong Kim
(74) *Attorney, Agent, or Firm*—Michael J. Ure

(57) ABSTRACT

A cache interface circuit includes a processor interface for receiving memory access requests from a processor, and for transmitting memory data back to the processor in response to processor requests. A main memory interface provides for issuing main memory access requests to a main memory and for receiving main memory data in response. A cache memory interface provides for issuing memory access requests to a cache memory, if operating in a cache mode, and for receiving cache memory data in response. A cache-bypass mode-control signal input provides for the processor to indicate a cache-bypass mode in which memory access requests are serviced from the main memory. A power control output provides for switching off operating power to the cache memory in response to a command received at the cache-bypass mode-control signal input that indicates all memory access requests should be serviced from the main memory.

3 Claims, 1 Drawing Sheet

U.S. PATENT DOCUMENTS

Figure 1:
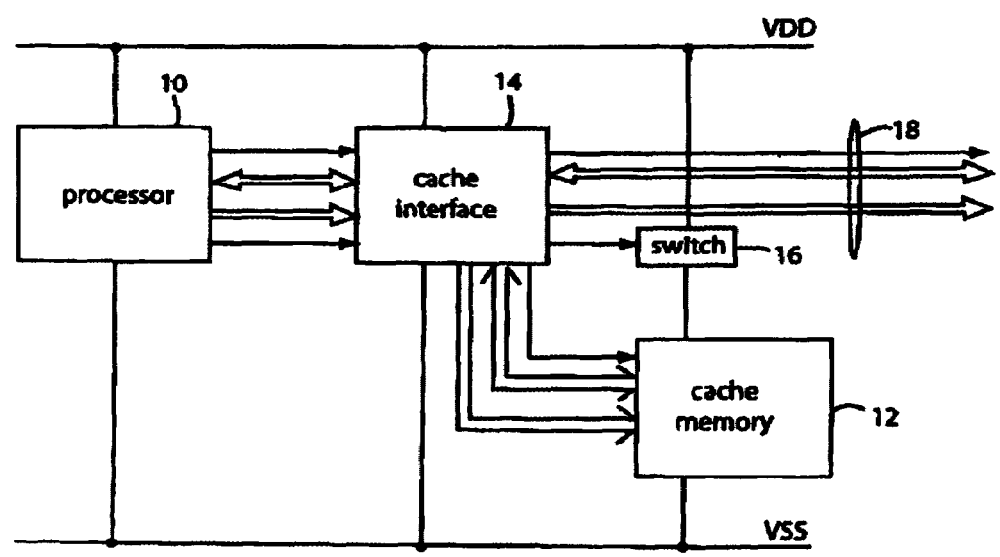

| | | | |
|---|---|---|---|
| 5,913,223 A * | 6/1999 | Sheppard et al. | 713/324 |
| 6,282,614 B1 * | 8/2001 | Musoll | 711/122 |
| 6,480,938 B1 * | 11/2002 | Vondran, Jr. | 711/125 |
| 6,496,888 B1 * | 12/2002 | Pole, II | 710/110 |
| 6,643,745 B1 * | 11/2003 | Palanca et al. | 711/138 |
| 2001/0049772 A1 * | 12/2001 | Choi et al. | 711/138 |
| 2002/0087900 A1 * | 7/2002 | Homewood et al. | 713/320 |
| 2002/0097624 A1 * | 7/2002 | Andersen et al. | 365/222 |
| 2002/0116567 A1 * | 8/2002 | Vondran | 711/3 |

* cited by examiner

CACHE INTERFACE CIRCUIT FOR AUTOMATIC CONTROL OF CACHE BYPASS MODES AND ASSOCIATED POWER SAVINGS

The invention relates to a data processing circuit with a cache memory.

Data processing circuits use cache memories to bridge the gap in speed between main memory and a processor circuit that executes program instructions. The cache memory contains copies of the data stored in main memory at memory addresses that are expected to be accessed by the processor circuit, for example because those addresses have been recently accessed by the processor circuit. The cache memory is able to deliver this data faster than the main memory.

It is known to arrange a data processing circuit so that it can switch between operating in a cache mode and a cache bypass mode. In the cache mode the cache memory is used to deliver data to the processing circuit if the processor circuit addresses a main memory location and data for that main memory location is available in the cache memory. In the cache bypass mode the data is always delivered from main memory. This is necessary for example if the data in main memory can change autonomously. When the known processor circuit needs to bypass the cache memory, its program contains an instruction that, when executed, switches the data processing circuit to the cache bypass mode. At a point in the program where it is no longer necessary to bypass the cache memory, the program contains an instruction that, when executed switches the data processing circuit from the cache bypass mode to the cache mode. As a result the cache memory can temporarily be bypassed during program execution.

It is an object of the invention to reduce the electric power consumed by data processing circuits, especially for data processing circuits that are used in battery powered equipment.

The data processing circuit according to the invention is set forth in claim 1. According to the invention power supply to the cache memory is cut-off when the data processing circuit operates in the cache bypass mode. Thus, power is saved. Alternatively, one could stop supply of clock signals to the cache memory. However, it has been found that for integrated circuits with sub-micron feature size this still leaves a significant power consumption due to subthreshold leakage currents.

When a program is written for the processing circuit the designer decides when to use the cache mode and when to use the cache bypass mode during program execution. In the cache mode the processing circuit executes programs faster because it uses the cache memory if possible, but the processing circuit consumes more power. In the cache bypass mode, the processing circuit is slower, but it consumes less power, because the cache memory does not consume power. Preferably, one identifies first portions of the program of the processing circuit that need to operate in the cache mode in order to meet real time constraints and second portions that need not operate in the cache mode. Between the first and second portions of the program one inserts instructions to switch between the cache mode and the cache bypass mode and back, as appropriate. This is independent of whether the second portions would operate correctly or incorrectly using cache memory. Typically, the second portions would operate correctly when using the cache memory, albeit that they use more power in that way.

These and other advantageous aspects of the invention will be described in more detail using the following FIGURE.

FIG. 1 shows a circuit diagram of a data processing circuit.

The data processing circuit of FIG. 1 contains a processor circuit 10, a cache memory 12, a cache interface circuit 14, a power supply switch 16 and a main memory interface 18. The data processing circuit has power supply connections VDD and VSS coupled to processor circuit 10, and cache interface circuit 14. Cache memory 12 is coupled to VDD via power supply switch 16. Processor circuit 10 has a data/address connection and a control output coupled to cache interface circuit 14. Cache interface circuit 14 has a data/address connection to cache memory 12, a data/address connection to main memory interface 18 and a control output coupled to a control input of power supply switch 16. The data processing circuit of FIG. 1 is typically incorporated in a single integrated circuit. When the data processing circuit of FIG. 1 is incorporated in an apparatus, main memory interface 18 is connected to a main memory (not shown) in an external integrated circuit. Alternatively, the main memory may also be part of the same integrated circuit as the circuit of FIG. 1.

In operation processor circuit 10 executes successive instructions from a program. In a cache mode, the power supply switch 16 is conductive. As a result of the execution of an instruction processor circuit 10 issues an address to cache interface circuit 14, for example for reading data corresponding to that address. In response, cache interface circuit 14 checks whether data for that address is available in cache memory 12. This is done using conventional cache memory techniques. If data for the address is available in cache memory 12, cache interface circuit 14 supplies that data to processor circuit 10 in response to the address. If no data is available for the address, cache interface circuit 14 obtains data from main memory addressed by the address. This data is then supplied to the processor circuit 10 as a response to the address and the data is stored in cache memory 12, in association with the address, for later use in response to a later reading instruction from processor circuit 10. The cache memory may be used either for reading both data that represents program instructions and data that represents operand data of instructions or only for program instructions or only for operand data.

The processing circuit of FIG. 1 can also operate in a cache bypass mode. In this mode, cache interface circuit 14 makes power supply switch 16 non-conductive. (Power supply switch 16 contains for example a PMOS transistor (not shown) with a main current channel that couples the power supply connection VDD with a power supply input of cache memory 12. The gate of the PMOS transistor may be used as control input. But of course other implementations of this switch are also possible). Thus, it is ensured that at least the memory cells of cache memory 14 do not receive a power supply voltage and hence do not draw subthreshold leakage current.

In the cache bypass mode cache interface circuit 14 services all memory reading operations from the processor circuit 10 via main memory interface 18. Cache interface circuit 14 does not read data from cache memory 14 in this mode, nor does it write data. (For reasons of simplicity read and write addresses may be supplied to cache memory 12 nevertheless, but without resulting in a read or write because the power to the cache memory 12 has been switched off.

Cache interface circuit 14 receives signals from processor circuit 10 to control switching between the cache mode and the cache bypass mode. When the processor circuit 10 executes an instruction to switch to the cache bypass mode, the processor circuit 10 issues a control signal to cache interface circuit 14 to switch to the cache bypass mode. Similarly, when processor circuit 10 executes an instruction to switch to the cache mode, the processor circuit 10 issues a signal to cache interface circuit 14 to switch to the cache mode. When the cache interface circuit 14 switches from the cache bypass mode to the cache mode it initializes the cache memory 12 so that no associations between main memory addresses and data are present. It is not essential that the instructions for switching between the cache mode and the cache bypass mode are executed by the processor circuit 10. When instructions from the program in general pass through the cache interface circuit 14 to processor circuit 10, cache interface 14 may intercept instructions for switching between the cache mode and the cache bypass mode and execute these instructions without an explicit signal from processor circuit 10.

The circuit of FIG. 1 allows a reduction in power consumption during execution of programs. Those portions of the program that are able to meet real time constraints, if any, without use of the cache memory are preferably executed in the cache bypass mode. The portions of the program that are able to meet the real time constraints only by using the cache are executed in cache mode.

As a result, an apparatus that contains the circuit of FIG. 1 and a main memory also contains a program with instructions that include switching instructions for switching instructions for switching between the cache mode and the cache bypass mode. The portions or portions of the program that would not execute with sufficient speed to meet the speed required by the apparatus, if executed without using the cache, are placed between mode switching instructions that ensure execution of that portion or those portions in the cache mode. Another portion, or other portions, of the program are placed between instructions that ensure execution of that other portion, or those other portions, in the cache bypass mode.

Switching instructions for switching between these modes may be inserted manually in the program. Alternatively, one may use an automatic program generating program, which uses a subdivision of the program into blocks, each block corresponding to a subroutine for example. The generating program is provided with a maximum execution duration value for time critical blocks. The generating program computes the time required to execute the block if the cache memory is not used. If the computed time exceeds the maximum execution duration, instructions are placed around the block to ensure its execution in the cache mode. If not, instructions are placed to cause execution in the cache bypass mode.

The invention claimed is:

1. A cache interface circuit, comprising:
   a processor interface for receiving memory access requests from a processor, and for transmitting memory data back to said processor in response to processor requests;
   a main memory interface for issuing main memory access requests to a main memory and for receiving main memory data in response;
   a cache memory interface for issuing memory access requests to a cache memory, if operating in a cache mode, and for receiving cache memory data in response;
   a cache-bypass mode-control signal input for said processor to indicate a cache bypass mode, in response to a programmer instruction inserted in a program being executed by said processor explicitly for the purpose of switching to cache bypass mode, in which cache bypass mode memory access requests are serviced from said main memory;
   a power control output for switching off operating power to said cache memory in response to a command received at said cache-bypass mode-control signal input that indicates all memory access requests should be serviced from said main memory.

2. The cache interface circuit of claim 1, further comprising:
   a cache-bypass mode program instruction interceptor connected to the processor interface and providing for switching between said cache and cache-bypass modes without having received an explicit signal to do so at the cache-bypass mode-control signal input;
   wherein, said processor need not take any action to switch between said cache and cache-bypass modes.

3. The cache interface circuit of claim 2, further comprising:
   a sequence of program instructions disposed in said main memory that require execution by said processor in said cache mode and that are bracketed by program instructions acted on by the cache-bypass mode program instruction interceptor to switch between said cache and cache-bypass modes.

* * * * *